United States Patent
Gross

(12) 
(10) Patent No.: US 6,512,523 B1
(45) Date of Patent: Jan. 28, 2003

(54) ACCURATE AVERAGING OF ELEMENTS USING INTEGER AVERAGING

(75) Inventor: Ornit Gross, Kibbutz Lohamei-Hageta'ot (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/537,457

(22) Filed: Mar. 27, 2000

(51) Int. Cl.$^7$ .............................. G09G 5/00; G06K 9/40; G06F 7/38
(52) U.S. Cl. .................. 345/606; 382/264; 708/445
(58) Field of Search ........................... 382/299, 236, 382/264, 272; 348/384.1; 386/111; 345/606, 643, 667, 581, 611; 708/445

(56) References Cited

U.S. PATENT DOCUMENTS

| | | | | |
|---|---|---|---|---|
| 4,941,190 A | * | 7/1990 | Joyce ........................... | 348/625 |
| 5,271,095 A | * | 12/1993 | Yamada ........................ | 345/428 |
| 5,774,600 A | * | 6/1998 | Strongin et al. ............. | 382/232 |
| 5,883,824 A | * | 3/1999 | Lee et al. ..................... | 708/445 |
| 5,886,794 A | * | 3/1999 | Kondo et al. ................. | 358/426.14 |
| 5,917,739 A | * | 6/1999 | Wong ............................ | 708/445 |
| 5,940,132 A | * | 8/1999 | Kondo et al. ................. | 348/441 |
| 5,982,373 A | * | 11/1999 | Inman et al. ................. | 345/419 |
| 6,007,232 A | * | 12/1999 | Wong ............................ | 708/445 |
| 6,295,376 B1 | * | 9/2001 | Nakaya ........................ | 375/240.17 |
| 6,320,593 B1 | * | 11/2001 | Sobel et al. .................. | 345/600 |

* cited by examiner

*Primary Examiner*—Jeffery Brier
*Assistant Examiner*—Ryan Yang
(74) *Attorney, Agent, or Firm*—Blakely, Sokoloff, Taylor & Zafman LLP

(57) ABSTRACT

A system and method for efficiently obtaining corrected results when averaging multiple integers together. The invention detects when round off errors occur during integer averaging operations, and determines if the accumulated errors are sufficient to require correction. If so, the result is modified by a correction factor to produce an accurate result. Errors can be detected by examining the even/odd status of pairs of numbers that are being averaged together. The invention can be employed with Single Instruction Multiple Data instructions to process multiple sets of integers in parallel. In one embodiment, the invention is used for averaging pixel values in the compression and/or decompression of digitized moving pictures.

26 Claims, 9 Drawing Sheets

|  | Example 1 | Example 2 | Example 3 | Example 4 |
|---|---|---|---|---|
| a | 2 | 3 | 3 | 3 |
| b | 4 | 5 | 4 | 4 |
| c | 3 | 2 | 2 | 2 |
| d | 7 | 4 | 4 | 3 |
| Processed values | | | | |
| ave_1 | 3.0 | 4.0 | 4.0 | 4.0 |
| ave_2 | 5.0 | 3.0 | 3.0 | 3.0 |
| result | 4.0 | 4.0 | 4.0 | 4.0 |
| half_err_1st | 0 | 0 | 1 | 1 |
| half_err_2nd | 0 | 1 | 1 | 1 |
| fixup_mask | 0 | 0 | 1 | 1 |
| return | 4 | 4 | 3 | 3 |
| True (non-rounded and uncorrected) values | | | | |
| true ave_1 | 3.0 | 4.0 | 3.5 | 3.5 |
| true ave_2 | 5.0 | 3.0 | 3.0 | 2.5 |
| true return | 4.0 | 3.5 | 3.25 | 3.0 |

```
ave_1 = simd_avg(a8, b8);        // 1st level averaging #1
ave_2 = simd_avg(c8, d8);        // 1st level averaging #2
result = simd_avg(ave_1, ave_2); // 2nd level avg
```

```
ave_1 = simd_avg(a8, b8);                  // 1st level averaging #1
ave_2 = simd_avg(c8, d8);                  // 1st level averaging #2
ave_1 = sat_sub( ave_1, const_1_8_bytes)   // sub "1" to reduce error
result = simd_avg(ave_1, ave_2);           // 2nd level avg
```

```
Iu8vec8 Accurate_4pels_avg_old ( Iu8vec8 a8, Iu8vec8 b8,
                                 Iu8vec8 c8, Iu8vec8 d8 )
{
        Iu16vec4 a4_low, a4_high, b4_low, b4_high;
        Iu16vec4 c4_low, c4_high, d4_low, d4_high;
        Iu16vec4 avg4_low, avg4_high;

1.      Iu8vec8 zero = _mm_setzero_si64();      // all zeros register
2.      a4_low  = unpack_low  ( a8, zero );     // (0,a3|0,a2|0,a1|0,a0)
3.      a4_high = unpack_high ( a8, zero );     // (0,a7|0,a6|0,a5|0,a4)
4.      b4_low  = unpack_low  ( b8, zero );     // (0,b3|0,b2|0,b1|0,b0)
5.      b4_high = unpack_high ( b8, zero );     // (0,b7|0,b6|0,b5|0,b4)
6.      c4_low  = unpack_low  ( c8, zero );     // (0,c3|0,c2|0,c1|0,c0)
7.      c4_high = unpack_high ( c8, zero );     // (0,c7|0,c6|0,c5|0,c4)
8.      d4_low  = unpack_low  ( d8, zero );     // (0,d3|0,d2|0,d1|0,d0)
9.      d4_high = unpack_high ( d8, zero );     // (0,d7|0,d6|0,d5|0,d4)

// prepare the low 4 avg results (of elements 3, 2, 1, 0)
10.     avg4_low = (a4_low + b4_low + c4_low + d4_low
                        + const_2_4_words) >> 2;

// prepare the high 4 avg results (of elements 7, 6, 5, 4)
11.     avg4_high = (a4_high + b4_high + c4_high + d4_high
                        + const_2_4_words) >> 2;

//merge the 8 avg results
12.     result = packu_sat ( (Is16vec4) avg4_low, (Is16vec4) avg4_high );
                        return (result);
}
```

FIG. 4A
(PRIOR ART)

```
lu8vec8 Accurate_4pels_average ( lu8vec8 a8, lu8vec8 b8,
                                 lu8vec8 c8, lu8vec8 d8 )
{
    lu8vec8 ave_1, ave_2, result;
    lu8vec half_err_1st, half_err_2nd, fixup_mask;

1.  ave_1 = simd_avg (a8, b8 );          // 1st stage averaging #1

2.  ave_2 = simd_avg (c8, d8 );          // 1st stage averaging #2

3.  result = simd_avg(ave_1, ave_2);     // 2nd stage averaging

// record 1 in lsb <=> some avg in the 1st stage carries +0.5 error
4.  half_err_1st = (a8 ^ d8) | (c8 ^ d8);

// record 1 in lsb <=> 2nd stage avg carries at least +0.5 error
5.  half_err_2nd = (ave_1 ^ ave_2);

// record 1 <=> result carries +1 error
6.  fixup_mask = half_err_1st & half_err_2nd & (*(lu8vec8*)const_1_8_bytes);

7.  return ( result - fixup_mask );      // compensate error where needed
```

FIG. 5A

|  | Example 1 | Example 2 | Example 3 | Example 4 |
|---|---|---|---|---|
| a | 2 | 3 | 3 | 3 |
| b | 4 | 5 | 4 | 4 |
| c | 3 | 2 | 2 | 2 |
| d | 7 | 4 | 4 | 3 |
| Processed values | | | | |
| ave_1 | 3.0 | 4.0 | 4.0 | 4.0 |
| ave_2 | 5.0 | 3.0 | 3.0 | 3.0 |
| result | 4.0 | 4.0 | 4.0 | 4.0 |
| half_err_1st | 0 | 0 | 1 | 1 |
| half_err_2nd | 0 | 1 | 1 | 1 |
| fixup_mask | 0 | 0 | 1 | 1 |
| return | 4 | 4 | 3 | 3 |
| True (non-rounded and uncorrected) values | | | | |
| true ave_1 | 3.0 | 4.0 | 3.5 | 3.5 |
| true ave_2 | 5.0 | 3.0 | 3.0 | 2.5 |
| true return | 4.0 | 3.5 | 3.25 | 3.0 |

FIG. 6

ACCURATE AVERAGING OF ELEMENTS USING INTEGER AVERAGING

BACKGROUND OF THE INVENTION

1. Field of the Invention

The invention pertains generally to computer processing. In particular, it pertains to obtaining accurate results when using integer averaging instructions that are inherently inaccurate because they round off the results.

2. Description of the Related Art

Many applications have been found in the computer field that involve averaging multiple numbers together. One such application is in the motion compensation (MC) algorithms used for encoding and decoding compressed digital data in the processing of moving video images. Basically, the MC operation includes a way to generate various pixels in a video frame being constructed, called the destination frame, based on related pixels from one or more reference frames. Averaging pixel values from the reference frame(s) is part of that process. Such averaging may reduce the information content in the resulting image, but this loss is more than compensated for by greatly reducing the amount of storage space required to store the video images and the amount of bandwidth required to transmit the video images.

FIG. 1 shows an example of representative pixel averaging. Block 11 is a block of pixels (also called pels) in a larger reference frame. Close-up view 12 shows an enlargement of four pixels a, b, c and d in the upper left corner of block 11. The values of these four pixels are averaged together to produce a single pixel e, shown in close-up view 13, which becomes the upper left pixel in block 16 of the destination frame. Typically, the values of all these pixels are represented as unsigned integers. Blocks 11 and 16 may contain different numbers of pixels.

This motion mode process is frequently referred to as "half-pel horizontally and half-pel vertically", or simply "half-half pel". In general, other averaging modes can be used such as "half-pel horizontal" prediction that averages two horizontally adjacent pixels, and "half-pel vertical" prediction that averages two vertically adjacent pixels.

A commonly used averaging operation can be defined as follows:

1. Half-pel: result=(value1+value2)//2
2. Half-half-pel: result=(value1+value2+value3+value4)//4 where "//" is defined as integer division with rounding to the nearest integer. Half-integer values are rounded away from zero. For example, a result of 3.5 would be rounded to 4. Since the results must be integers, the round off error from any single averaging function can produce a result that is inaccurate by as much as 0.5. This is acceptable, and even unavoidable, in the final result. But in multi-stage averaging operations, round off errors from each stage can accumulate, leading to errors in the final results that are significantly greater. Various conventional approaches have been tried to reduce the amount and/or frequency of occurrence of these errors.

Some computer instruction sets have an instruction that performs an integer averaging function between two numbers, thus permitting easy implementation of the pixel averaging function. If more than two pixels are being averaged, the operation must proceed in successive stages, potentially leading to the aforementioned accumulation of round off errors. In conventional approaches to reducing the final error, a tradeoff must be made between speed and accuracy.

One conventional approach is shown in the code and flow chart of FIGS. 2A and 2B, respectively. In a first stage, elements a and b are averaged to produce a first intermediate result ave_1, and elements c and d are averaged to produce a second intermediate result ave_2. In a second stage, the first and second intermediate results are averaged to produce a final result. This method is fast, but can produce an error of +0.5 in the first stage and an additional error of +0.5 in the second stage, resulting in an error of +1.0 in approximately 37% of the final results. The term 'simd' indicates the use of a Single Instruction Multiple Data (SIMD) instruction which simultaneously performs the same function on multiple parallel data elements in a packed format.

FIGS. 3A and 3B show the code and flow chart, respectively, of a second conventional approach that modifies the first approach by subtracting the value "1" from one of the intermediate results before averaging those two results together in the second stage. This artificial method of blindly compensating for expected errors reduces the probability of getting an error of +1.0 to about 13%.

FIGS. 4A and 4B show the code and flow chart, respectively, of a conventional brute force approach. All four pixel values are unpacked, added together, and divided by 4 (shifted to the right by two bits). A constant of '2' (const_2_4_words) is also added to compensate for the fact that shifting to the right rounds down by truncating rather than rounding up as required. This approach is accurate but slow, since it requires eight unpack operations, eight add operations, two shift operations, and one pack operation.

Thus, each of the conventional approaches to averaging pixel values is either fast but inaccurate, or accurate but slow.

SUMMARY OF THE INVENTION

An embodiment of the invention includes a method of averaging pixel values, which includes performing a first stage operation by averaging first and second pixel values to produce a first intermediate integer result, and also by averaging third and fourth pixel values to produce a second intermediate integer result. A second stage operation is performed by averaging the first and second intermediate integer results to produce a third intermediate integer result. It is detected whether the first stage operation produced an error and whether the second stage operation produced an error. If both the first and second stages produced an error, a correction value is applied to the third intermediate integer result to produce a final pixel value.

BRIEF DESCRIPTION OF THE DRAWINGS

FIGS. 4A, 4B show a third prior art code and flow chart sequence for averaging values.

FIGS. 5A, 5B show a code and flow chart sequence of the invention for averaging values.

FIG. 6 shows specific numerical examples as they would be processed by the invention.

DETAILED DESCRIPTION OF THE INVENTION

A moving picture is shown by rapidly and sequentially displaying a series of still images, or frames. When the moving picture has been compressed for storage or transmission and then reconstructed for display, an accurate rendition of a first frame will typically be displayed first, followed by one or more frames that have been reconstructed from a lesser amount of intermediate data, using the first frame (and possibly other frames) as a reference. After a few frames have been reconstructed and shown in this manner, a new accurate frame will be displayed, again followed by several more reconstructed frames. Each of these reconstructed frames is constructed by operating on the pixels of the reference frame (and possibly other frames) in various ways to create associated pixels in the reconstructed frame. During this reconstruction, the frame being created is called the destination frame.

Figure 1:
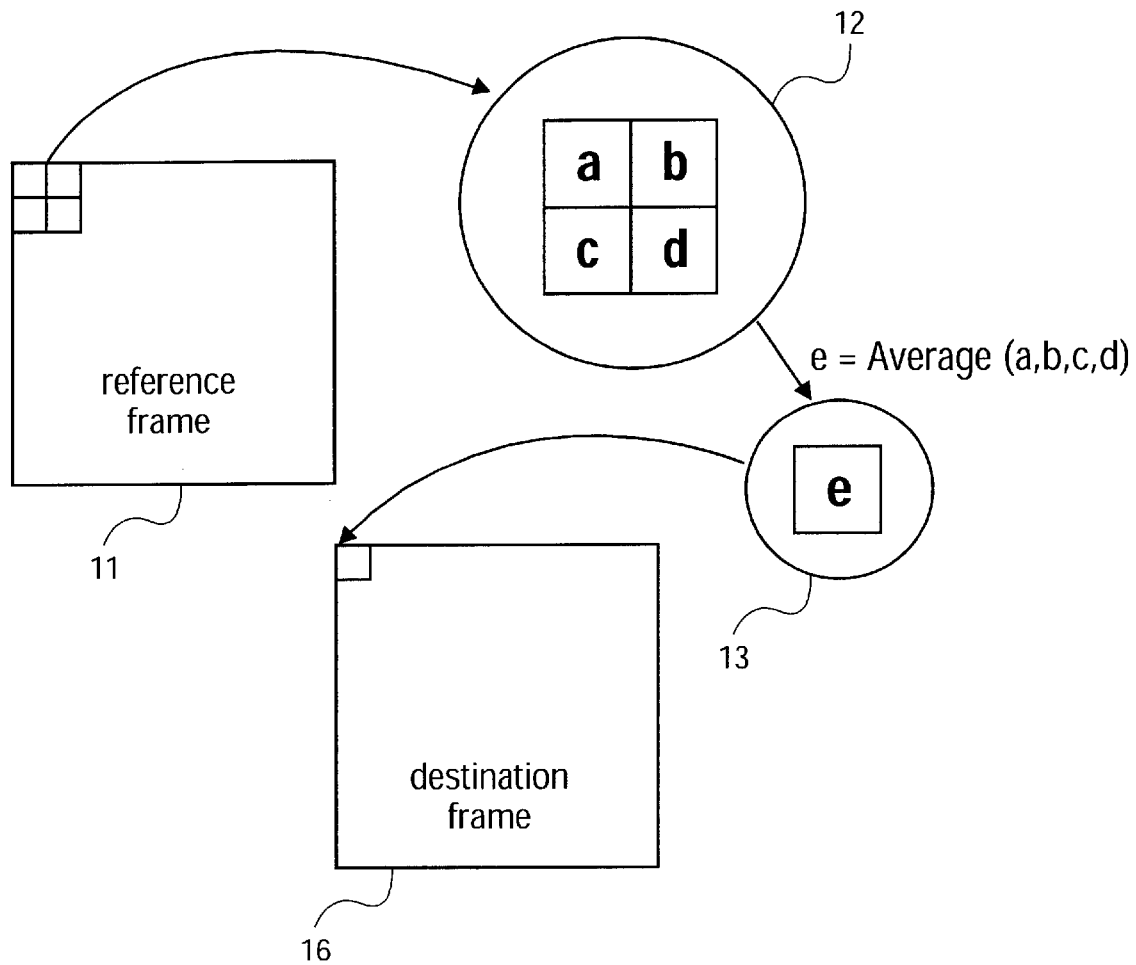
FIG. 1 shows pixel averaging in a prior art motion compensation application.
Figures 2A, 2B:
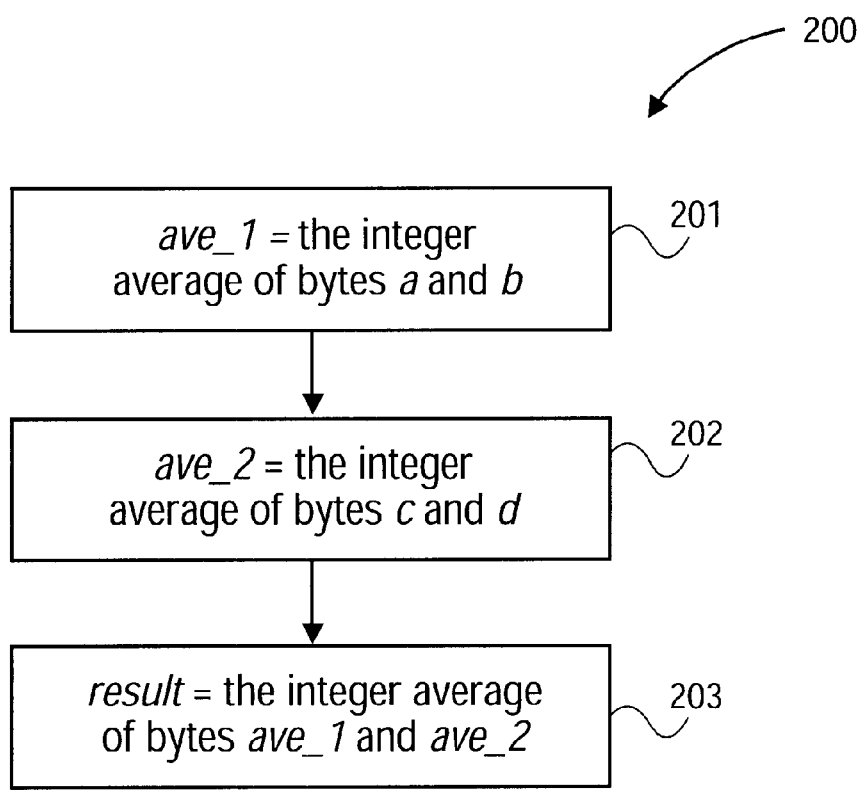
FIGS. 2A, 2B show a first prior art code and flow chart sequence for averaging values.
Figures 3A, 3B:
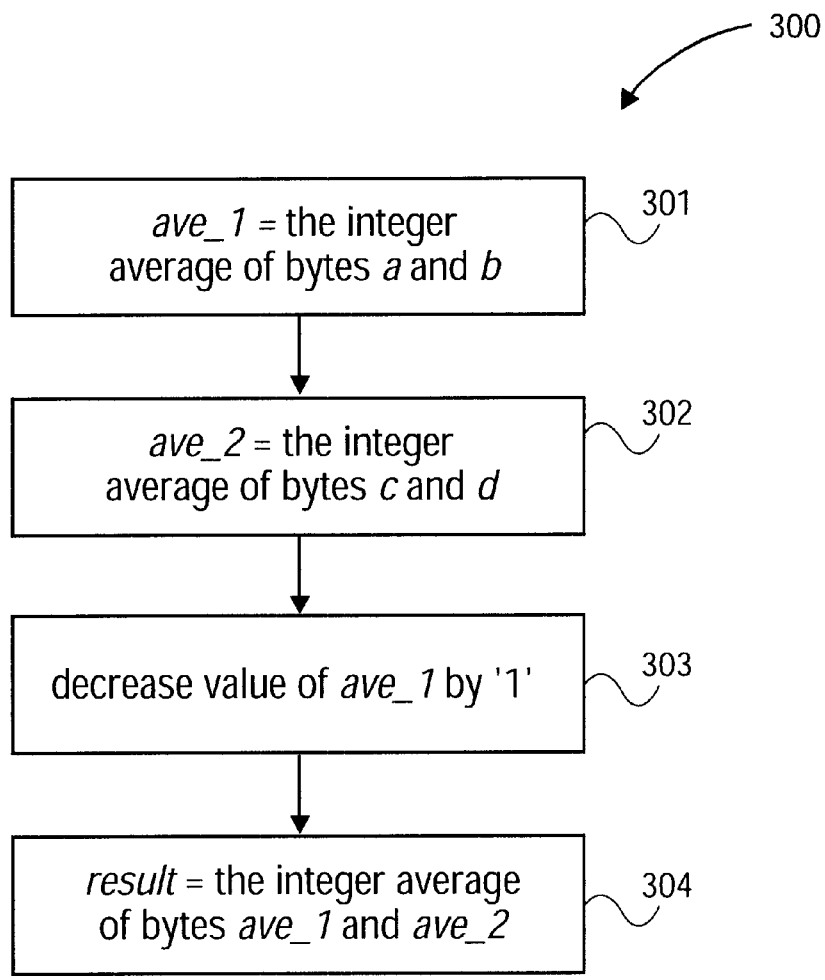
FIGS. 3A, 3B show a second prior art code and flow chart sequence for averaging values.
Figure 4B:
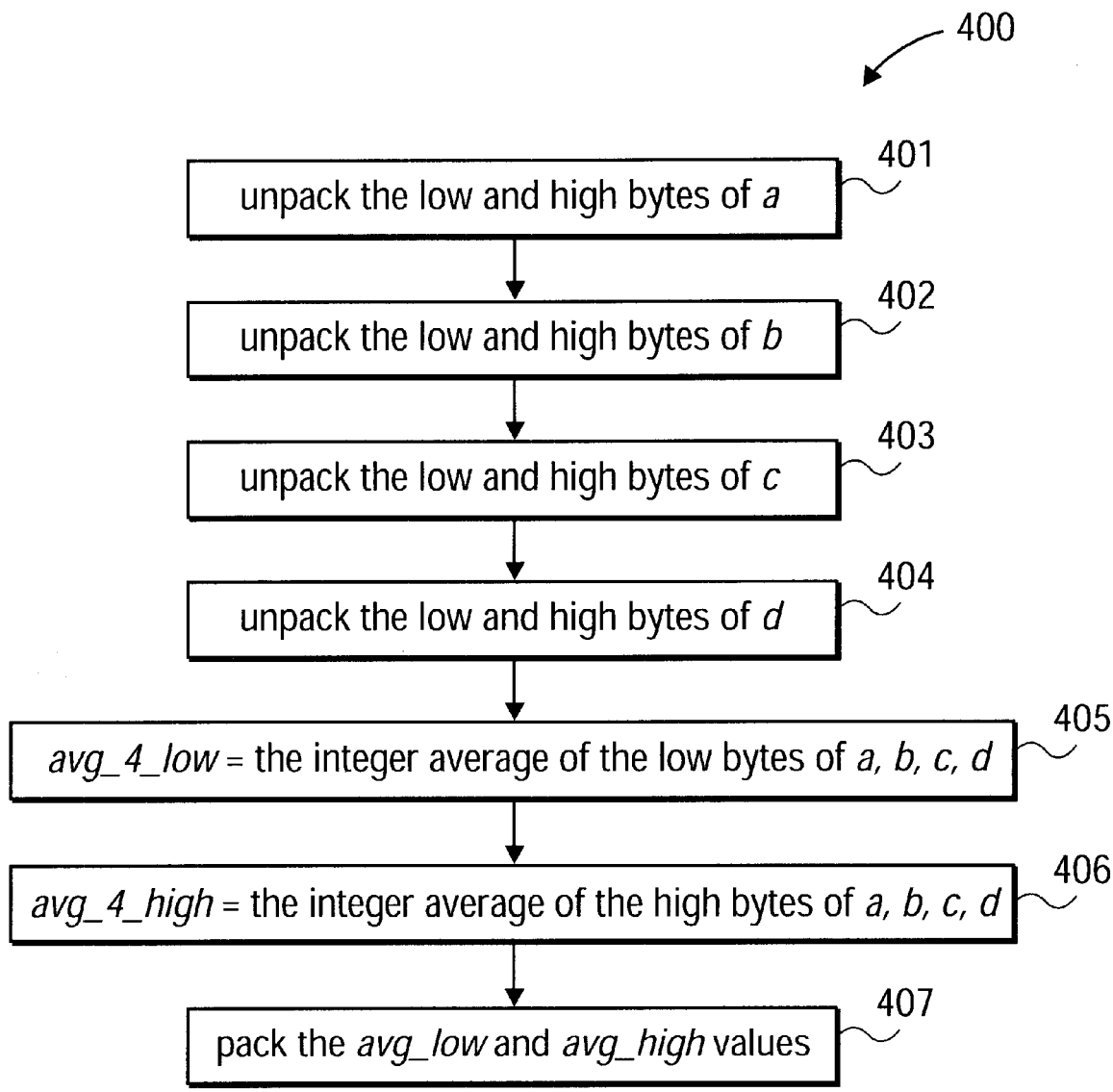

One of the techniques used in building a destination frame is to average the values of several adjacent pixels in the reference frame into a single value for a single pixel in the destination frame. In both reference and destination frames, pixel values can be represented by one or more unsigned binary integers. FIG. 1 shows how this process can be applied. A block 11 of pixels in a reference frame is to be converted into a block 16 of pixels in the equivalent part of a destination frame. Part of this conversion involves converting a 2×2 block of adjacent pixels 12 (shown enlarged as pixels a, b, c and d from the upper left corner of block 11) into a single pixel 13 (shown enlarged as pixel e which forms the upper left corner of block 16). To make pixel e a reasonable substitute for the four-pixel block containing pixels a–d, the values of pixels a, b, c and d are averaged to produce the value for pixel e.

The construction of a destination frame typically takes place during both the encoding and decoding of digitized moving pictures. Decoding should take place in real time, so the reconstructed images can be displayed in real time. By the same token, encoding should take place in real time if it is done from images received in real time. In either case, there is generally a tradeoff between how long the relevant computations take and the quality of the final images. The processing must be done quickly and efficiently, since the alternative is to degrade the final image quality.

The relevant processing is typically done by a microprocessor, programmed specifically for this task. Processing speeds can be improved if the microprocessor has instructions that efficiently perform some of the computations. An averaging instruction is well suited for the pixel averaging function, provided it operates quickly and efficiently. An averaging instruction is one that determines the average value of two or more numbers. For speed of operation, an instruction that averages only two numbers is generally superior for this function. Pixel values are generally unsigned integers, so it is not necessary to use expensive floating point hardware for this function. Therefore, an averaging instruction that operates only on integers, and returns an integer for a result, is preferred.

Such instructions can be designed to operate on specific sizes of integers, such as eight-bit bytes or sixteen-bit words. Within those constraints, the instruction might also be capable of operating on multiple bytes or words within a packed register at the same time. For example, a 128-bit register contains 16 bytes, each of which can be averaged with its corresponding byte in another 128-bit register, to produce a series of 16 results in a third 128-bit register.

Since the relevant instructions are integer instructions, fractional results are not permitted. For example, the average of the integers 5 and 6 is 5.5, but forcing the result to be an integer using the aforementioned rounding convention will round this up to 6. This has significant implications for multi-stage averaging functions, in which this round off error can become cumulative and create significant errors in the final result.

Averaging four pixel values together with an averaging instruction is done in two stages. The first stage separates the four values into two pairs, and averages each pair to produce two intermediate values. The second stage averages the two intermediate values from the first stage to produce an average value for all four pixels. In this two-stage sequence, each stage can contribute a potential error of 0.5, leading to a potential error of 1.0 after the second stage. These errors are described as potential errors because they will not occur in every case. Since the applicable convention requires that fractions of 0.5 be rounded up, the resulting rounded value of any single two-number average will either be completely accurate (if the true average was an integer), or it will be in error by +0.5 (if the true average included a 0.5 fractional component). The +0.5 errors are generated only under certain circumstances. Any true (non-rounded) average of two integer inputs will produce an output that is either an integer itself, or an integer plus one-half. No other results are possible. An integer will be produced if both inputs are even numbers or if both integers are odd numbers. An integer plus one-half will be produced if one input is even and the other is odd. But since the result must be rounded up to an integer, a +0.5 error in an integer average of two integer inputs will exist only if one of the inputs is odd and the other input is even. For all other cases, there is no error.

The odd/even status of a binary number can be determined by examining the least significant bit (LSB). An odd number will have a LSB of '1', while an even number will have a LSB of '0'. Therefore, the existence of a +0.5 error in a binary integer average can be shown by simply determining that the LSB's of the two inputs are not the same. This can be done in various ways: 1) An exclusive OR can be performed on the two LSB's—a result of '1' indicates that one input is even and the other is odd. 2) The LSB's can be added. The LSB of the sum will likewise be a '1' if one input is even and the other is odd.

Using this process, it can be determined if the first stage has contributed an error of +0.5, and it can also be determined if the second stage has contributed an error of +0.5. A correction is necessary only if both stages contribute an error, making the final result in error by +1.0.

Figure 5B:
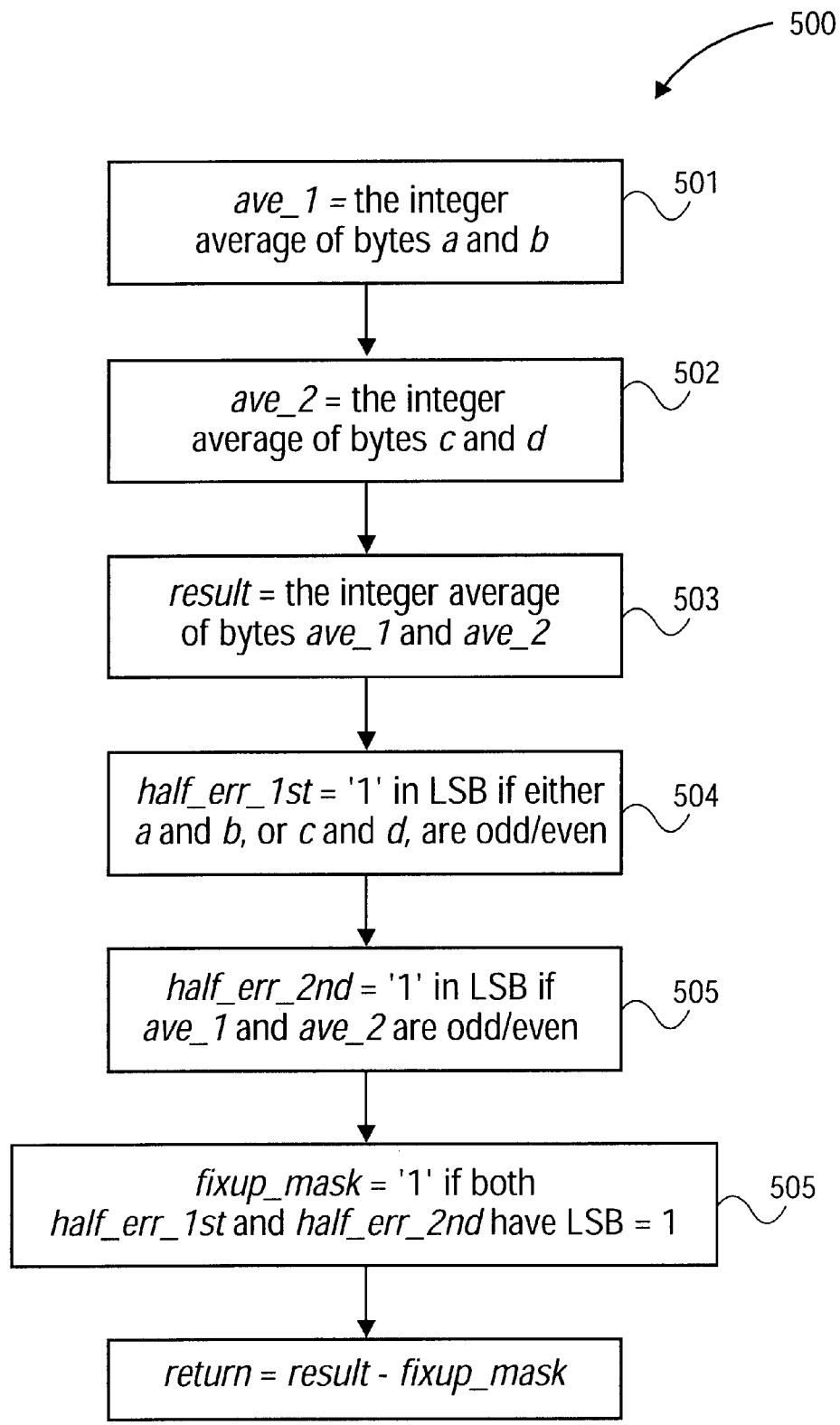

Following these principles, FIG. 5A shows a code sequence, and FIG. 5B shows a flow chart, of the invention that accurately corrects accumulated round off errors for multi-stage averaging functions, without seriously sacrificing execution speed. Since the averaging instructions operate on only two values at once, two stages are needed to average four values together. As shown in FIG. 5A, pairs of values are averaged in a first stage (lines 1, 2) to produce two intermediate values, and the two intermediate values are then averaged in a second stage (line 3) to produce a result. The accumulated error is then determined in lines 4, 5, and a correction factor is generated and applied in lines 6–7 to correct for the accumulated error. A more detailed description of the FIG. 5A follows:

Lines 1–2: The first stage performs two separate averages on the data elements a, b, c, d. Elements a and b are averaged together to produce the first intermediate integer value ave_1. Elements c and d are averaged together to produce the second intermediate integer value ave_2. Since both of these steps are integer averaging operations, either of these two first-stage averages can potentially contribute an error of +0.5.

Line 3: The second stage performs an average on the two intermediate integer values ave__1 and ave__2 to produce the value result. Since this is also an integer average, the second stage can potentially contribute an additional error of +0.5. The value of result therefore carries a potential error of +1.0, including +0.5 from the first stage and +0.5 from the second stage.

Line 4: This step determines if the first stage actually produced an error. An exclusive-OR (XOR) operation is performed on elements a and b, and an XOR is also performed on elements c and d. If either XOR produces a '1' in the least significant bit position, indicating the two elements to be even and odd, respectively, the LSB of a parameter half_err__1st is set.

Line 5: This step determines if the second stage actually contributed an error. An XOR is performed on the intermediate values ave__1 and ave__2. If the XOR produces a '1' in the LSB position, indicating the two intermediate values are even and odd, respectively, the LSB of the parameter half__err__2nd is set.

Line 6: A mask is created using an AND operation on half_err__1st and half_err__2nd, to check whether both stages generated errors. If the result of the AND operation produces a '1', indicating a '1' in the LSB of both parameters, then errors were detected in both stages and the accumulated error is +1.0. A constant mask, const__1__8__bytes, containing all zeros except for a 1 in the LSB position, is applied with an AND operation on the result of half__err__1st AND half_err__2nd in order to mask off all its bits except the LSB. As a result, the value in each byte of fixup__mask is either 0 or 1.

Line 7: In the final step, the mask is subtracted from the result of line 3 to yield the corrected result.

FIG. 5B shows a flow chart for the code of FIG. 5A. At block 501, an integer average is taken of bytes a and b to produce the intermediate value ave__1. (Although 'bytes' are used in this and other examples herein, other sizes of numbers can also be used, such as words, double words, quad words, etc.). At block 502, an integer average is taken of bytes c and d to produce the intermediate value ave__2. Due to the nature of integer averaging, ave__1 and ave__2 might each contain an error of +0.5 or no error at all. At block 503, an integer average is taken of the intermediate values ave__1 and ave__2 to produce the value labeled result. Any error that exists in result has two contributing factors: the error contributed by stage 1 (blocks 501 and 502) and the error contributed by stage 2 (block 503).

Block 504 detects if any error was contributed in stage 1 to the value of ave__1. As previously described, an integer average of a and b will contain an error of +0.5 if a is odd and b is even, or if a is even and b is odd. This can be determined by examining the LSB of each, which will be a '1' for an odd number and a '0' for an even number. In one embodiment, the LSB's of a and b are XOR'd together. If the XOR produces a '1' in the LSB, then one of the values a and b is odd, and the other is even, indicating the existence of a +0.5 error in ave__1. If the XOR produces a '0' in the LSB, then either both a and b are even, or both a and b are odd, indicating no error in ave__1. A similar examination of the LSB's of c and d is performed to determine if ave__2 contains an error of +0.5 or no error at all. If either or both of ave__1 and ave__2 contains an error, the LSB of half__err__1st is set to a '1', otherwise it is set to a '0'.

At block 505, the LSB's of ave__1 and ave__2 are similarly examined to determine if these two quantities are even/odd. If they are even/odd, then the LSB of half__err__2nd is set to a '1' indicating that the second stage has contributed an error of +0.5, otherwise it is set to a '0'.

In block 506, fixup__mask is generated by performing an AND operation on half_err__1st and half_err__2nd, and performing an AND operation on that result with const__1__8__bytes, which has a '1' in the LSB position of each byte and all 0's elsewhere. This will produce a '1' for each byte of fixup__mask if both half_err__1st and half_err__2nd contained a '1' in the LSB positions, and will produce a '0' otherwise. Thus each byte of fixup__mask will be a '1' if stage 1 and stage 2 both contributed an error, and will be a '0' if either or both stages did not contribute an error.

In block 507, fixup__mask is subtracted from result to produce the final corrected answer, labeled return. Therefore, a '1' is subtracted from result if correction is needed, while result remains unchanged (a '0' is subtracted) if no correction is needed.

FIG. 6 compares the values derived from this process with the 'true' values that would be derived when determining averages without any rounding off. Four examples are shown, illustrating the invention with different combinations of values. In Example 1, a and b are both even, while c and d are both odd. This condition produces all integer results in stage 1, with no rounding necessary. Therefore, integer averages ave__1 and ave__2 have the same values of 3 and 5, respectively, as are obtained without rounding. This produces no error in stage 1, and a '0' value in half_err__1st. The resulting intermediate averages ave__1 and ave__2 are both odd, which similarly produces a non-rounded integer average for result, and no error is produced in stage 2. Thus, the LSB's of half_err__1st, half__err__2nd, and fixup__mask are all set to '0' to produce no correction factor, and the final calculated answer return is 4, the same as the true average that would be determined with non-rounded precision calculations.

In Example 2, pair a,b are both odd, while pair c,d are both even, again resulting in no error in stage 1 and a '0' value for half_err__1st. However, in this case ave__1 is even, while ave__2 is odd, and the average of these two quantities produces a true value of 3.5 and a rounded value of 4. This integer average is in error by +0.5, so half_err__2nd is set to '1'. Since only one of the stages (the second stage) detected an error, fixup__mask is a '0', and no correction needs to be made to result to produce the final answer return. The true value of return is 3.5, and the calculated value is 4, a difference of 0.5. Since any calculated value that is forced to be an integer value can produce an error of up to 0.5, this error is allowable and potentially unavoidable, and no attempt is made to correct an error which is produced solely in stage 2.

In Example 3, the pair a,b is odd/even, while the other pair c,d is even/even. This leads to an error of +0.5 in ave__1, which is rounded to 4 from its true value of 3.5, and no error in ave__2, which already has an integer value of 3 in its true form. An error in either pair triggers a correction flag in stage 1, so the LSB of half_err__1st is set to '1'. Ave__1 and ave__2 are even and odd, respectively, so averaging them together in stage 2 produces an additional error when their true average value of 3.5 is rounded off to 4 in result. This stage 2 error causes the LSB of half_err__2nd to be set to a '1'. Since both half_err__1st and half_err__2nd are now set to '1', operating on them with an AND operation produces a '1' in the LSB of fixup__mask. This correction factor is then subtracted from result to produce the final answer return. In this example, the true average of a, b, c, and d is 3.25, while the calculated integer value is 3.

In Example 4, pair a,b and pair c,d both contain even/odd combinations. This leads to an error of +0.5 in ave_1, which is rounded to 4 from its true value of 3.5, and an error of +0.5 in ave_2, which is rounded to 3 from its true value of 2.5. Half_err_1st is set to 1, since at least one of ave_1 and ave_2 contained an even/odd pair and therefore created a stage 1 error. Stage 2 also produces an error, since the rounded values of ave_1 and ave_2 also represent an even/odd pair, and half_err_2nd is also set to a '1'. Half_err_1st and half_err_2nd are AND'd together to produce a '1' in fixup_mask, and this value is subtracted from result to produce the final answer return. Both the true value of return and its calculated integer value are 3, so the process of the invention eliminated all error in this example.

A comparison of Examples 1–4 shows that if the true value of the four-element averaging process produces a fractional component of 0.5, it will be rounded up to the next higher integer, while if it contains a fractional component of 0.25 it will be rounded down to the next lower integer. Fractional components of 0.0 are not changed. This is in full compliance with the aforementioned rounding conventions.

This procedure has been described for a process that averages two values at a time, implying the data is provided in an unpacked format. However, some computers contain Single Instruction Multiple Data (SIMD) instructions that perform the same function in parallel on multiple elements in a packed format. For example, if 16 bytes of values for 16 different a elements are packed into a 128-bit source register, and 16 bytes of values for 16 different b elements are likewise packed into another 128-bit source register, the averaging instruction can perform separate averaging functions on 16 different pairs of a,b values at the same time, placing the 16 results in the 16 bytes of a 128-bit destination register. The other functions can likewise be performed in parallel on 16 byte-sized elements, with each element being averaged, XOR'd, stored, and corrected independently of the other 15 elements. SIMD instructions may also operation on words, double words, quad words, or other size data elements in a packed format.

The invention has been described in terms of averaging four pixels together by averaging two pairs of initial elements in a first stage and one pair of intermediate elements in a second stage. However, other quantities of pixels can be averaged by the invention by changing the number of stages. For example, eight initial elements can be processed by averaging four pairs of elements in a first stage, two pairs of intermediate elements in a second stage, and the resulting pair of intermediate elements in a third stage. Since each stage can potentially contribute an error of +0.5, the mask can indicate the total number of stages containing errors, and a correction of 1.0 subtracted for every two stages containing errors. This principle can be extended to n stages, capable of averaging $2^n$ values.

Figure 7:
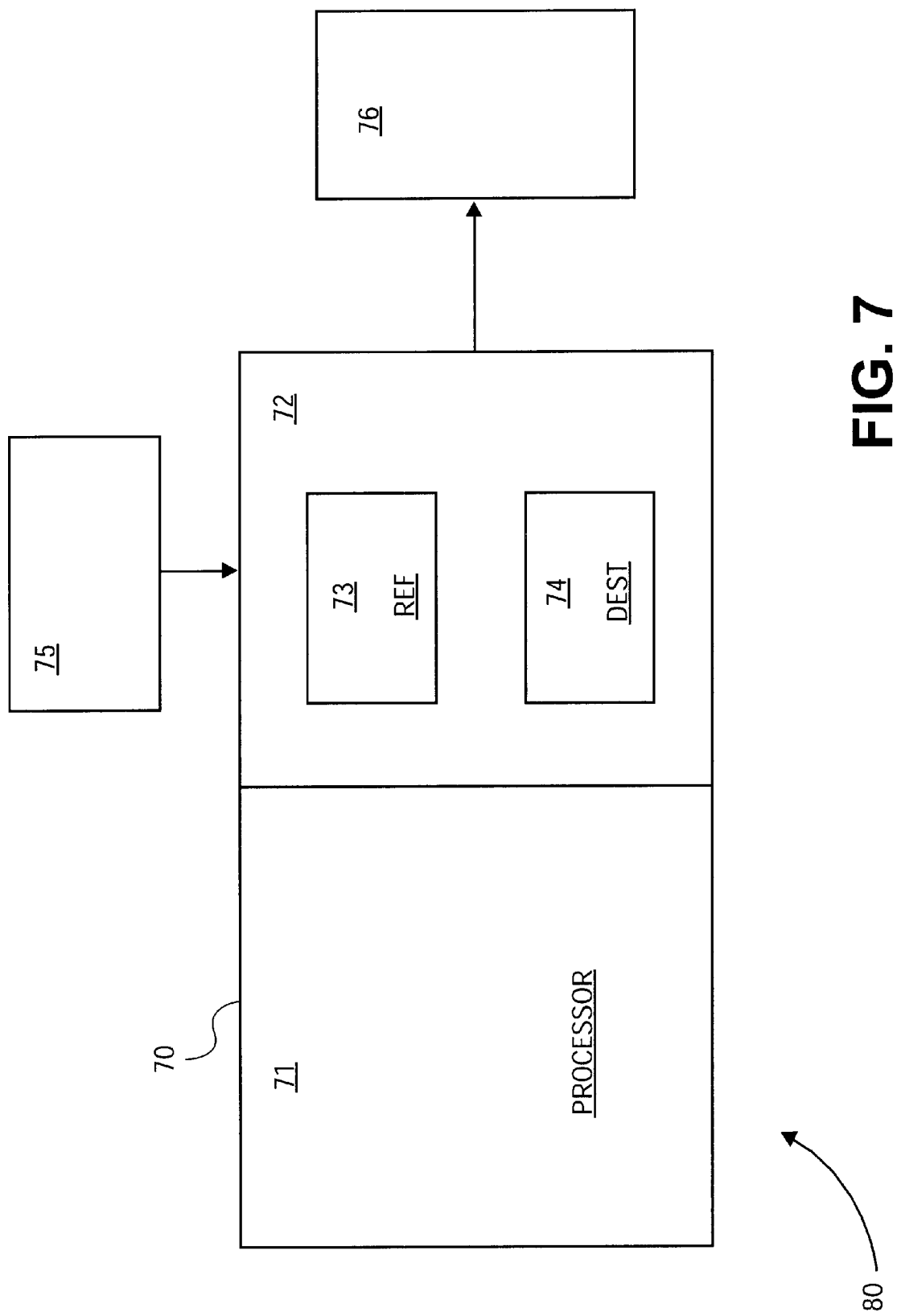
FIG. 7 shows a block diagram of a computer system of the invention.

FIG. 7 shows a block diagram of a computer system 80 of the invention. Graphics processing device 70 can include a processor 71 operating with a memory system 72, which can be used to hold reference frame 73 and destination frame 74 during processing. Multiple reference and destination frames 73, 74 might be stored in memory 72 at the same time. Memory 72 can be main memory for the system's central processor. Processor 71 and memory 72 can also be part of a subsystem dedicated to graphics processing or the like. Processor 71 can be used to perform the operations previously described, using reference frame 73 as a source for pixels a–d, and using destination frame 74 as a destination for pixel e. The data to produce reference frame 73 can be obtained from one or more source devices 75, such as a video camera or a disk on which the source images are stored. The data produced in destination frame 74 can be delivered to one or more receiving devices 76, such as a video display device or a transmission channel.

One embodiment of the invention averages pixel values for the translation of digitized video data, such as in a motion compensation process. Such translation can be utilized during compression of video data for storage and/or transmission. It can also be utilized when compressed video data is decompressed for display. The efficiency of the invention makes it well suited for other types of high speed or real-time data averaging functions.

The invention can be implemented in dedicated circuitry. The invention can also be implemented as instructions stored on a machine-readable medium, which can be read and executed by at least one processor to perform the functions described herein. A machine-readable medium includes any mechanism for storing or transmitting information in a form readable by a machine (e.g., a computer). For example, a machine-readable medium can include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The foregoing description is intended to be illustrative and not limiting. Variations will occur to those of skill in the art. Such variations are intended to be encompassed by the invention, which is limited only by the spirit and scope of the claims.

I claim:

1. A method of averaging pixel values, comprising:
   providing first, second, third and fourth pixel values;
   performing a first stage operation by averaging the first and second pixel values to produce a first intermediate integer result and by averaging the third and fourth pixel values to produce a second intermediate integer result;
   performing a second stage operation by averaging the first and second intermediate integer results to produce a third intermediate integer result;
   detecting whether the first stage operation produced an error and whether the second stage operation produced an error; and
   applying a correction value to the third intermediate integer result to produce a final pixel value only if the first and second stages each produced an error.

2. The method of claim 1, wherein said detecting whether the first stage produced an error includes at least one of:
   determining if one of the first and second pixel values is odd and the other of the first and second pixel values is even; and
   determining if one of the third and fourth pixel values is odd and the other of the third and fourth pixel values is even.

3. The method of claim 1, wherein said detecting whether the second stage produced an error includes determining if one of the first and second intermediate integer values is odd and the other of the first and second intermediate integer values is even.

4. The method of claim 1, wherein said applying a correction value includes:
   setting the correction value to '1' if the first and second stages both produced an error and setting the correction value to '0' if the first and second stages did not both produce an error; and subtracting the correction value from the third intermediate result.

5. The method of claim 1, wherein said detecting includes performing an exclusive OR operation on least significant bits.

6. The method of claim 1, wherein the first, second, third and fourth pixel values represent adjacent first, second, third and fourth pixels, respectively.

7. A method, comprising:
performing a motion compensation function, including:
providing a reference frame containing first, second, third and fourth pixel values;
performing a first stage operation by averaging the first and second pixel values to produce a first intermediate integer result and by averaging the third and fourth pixel values to produce a second intermediate integer result;
performing a second stage operation by averaging the first and second intermediate integer results to produce a third intermediate integer result;
detecting whether the first stage operation produced an error and whether the second stage operation produced an error;
applying a correction value to the third intermediate integer result to produce a final pixel value if the first and second stages each produced an error; and
providing the final pixel value to a destination frame.

8. The method of claim 7, wherein said detecting whether the first stage produced an error includes at least one of:
determining if one of the first and second pixel values is odd and the other of the first and second pixel values is even; and
determining if one of the third and fourth pixel values is odd and the other of the third and fourth pixel values is even.

9. The method of claim 7, wherein said detecting whether the second stage produced an error includes determining if one of the first and second intermediate integer values is odd and the other of the first and second intermediate integer values is even.

10. The method of claim 7, wherein said applying a correction value includes:
setting the correction value to '1' if the first and second stages both produced an error and setting the correction value to '0' if the first and second stages did not both produce an error; and
subtracting the correction value from the third intermediate result.

11. The method of claim 7, wherein said detecting includes performing an exclusive OR operation on at least two least significant bits.

12. The method of claim 7, wherein the first, second, third and fourth pixel values represent adjacent first, second, third and fourth pixels, respectively.

13. A apparatus, comprising:
at least one memory to hold a reference frame and a destination frame;
a device coupled to the at least one memory to perform:
providing first, second, third and fourth pixel values from the reference frame;
performing a first stage operation by averaging the first and second pixel values to produce a first intermediate integer result and by averaging the third and fourth pixel values to produce a second intermediate integer result;
performing a second stage operation by averaging the first and second intermediate integer results to produce a third intermediate integer result;
detecting whether the first stage operation produced an error and whether the second stage operation produced an error; and
applying a correction value to the third intermediate integer result to produce a final pixel value for the destination frame only if the first and second stages each produced an error.

14. The apparatus of claim 13, wherein the device is a logic circuit.

15. The apparatus of claim 14, wherein the device is a processor.

16. A machine-readable medium having stored thereon instructions, which when executed by at least one processor, cause said at least one processor to perform the following:
providing first, second, third and fourth pixel values;
performing a first stage operation by averaging the first and second pixel values to produce a first intermediate integer result and by averaging the third and fourth pixel values to produce a second intermediate integer result;
performing a second stage operation by averaging the first and second intermediate integer results to produce a third intermediate integer result;
detecting whether the first stage operation produced an error and whether the second stage operation produced an error; and
applying a correction value to the third intermediate integer result to produce a final pixel value only if the first and second stages each produced an error.

17. The medium of claim 16, wherein said detecting whether the first stage produced an error includes at least one of:
determining if one of the first and second pixel values is odd and the other of the first and second pixel values is even; and
determining if one of the third and fourth pixel values is odd and the other of the third and fourth pixel values is even.

18. The medium of claim 16, wherein said detecting whether the second stage produced an error includes determining if one of the first and second intermediate integer values is odd and the other of the first and second intermediate integer values is even.

19. The medium of claim 16, wherein said applying a correction value includes:
setting the correction value to '1' if the first and second stages both produced an error and setting the correction value to '0' if the first and second stages did not both produce an error; and
subtracting the correction value from the third intermediate result.

20. The medium of claim 16, wherein said detecting includes performing an exclusive OR operation on at least two least significant bits.

21. The medium of claim 16, wherein the first, second, third and fourth pixel values represent adjacent first, second, third and fourth pixels, respectively.

22. A system, comprising:
a source device to produce a reference frame;
a receiving device to receive a destination frame;
a graphics processing apparatus coupled to the source device and receiving device and including:
at least one memory to hold the reference frame and the destination frame;
a processing device coupled to the at least one memory to perform:

providing first, second, third and fourth pixel values from the reference frame;

performing a first stage operation by averaging the first and second pixel values to produce a first intermediate integer result and by averaging the third and fourth pixel values to produce a second intermediate integer result;

performing a second stage operation by averaging the first and second intermediate integer results to produce a third intermediate integer result;

detecting whether the first stage operation produced an error and whether the second stage operation produced an error; and applying a correction value to the third intermediate integer result to produce a final pixel value for the destination frame if the first and second stages each produced an error.

23. The system of claim 22, wherein the processing device is a logic circuit.

24. The system of claim 22, wherein the processing device is a processor.

25. The system of claim 22, wherein the source device is one of a video camera and a storage device.

26. The system of claim 22, wherein the receiving device is one of a display device and a transmission channel.

* * * * *